United States Patent
Hill et al.

(10) Patent No.: US 10,875,115 B2
(45) Date of Patent: Dec. 29, 2020

(54) JOINING OF DISSIMILAR MATERIALS (71) Applicants: John Edward Hill, Shelby Township, MI (US); Terence Anthony Devers, London (CA); Gianfranco Gabbianelli, Birmingham, MI (US)

(72) Inventors: John Edward Hill, Shelby Township, MI (US); Terence Anthony Devers, London (CA); Gianfranco Gabbianelli, Birmingham, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 16/666,207

(22) Filed: Oct. 28, 2019

(65) Prior Publication Data
US 2020/0061731 A1 Feb. 27, 2020

Related U.S. Application Data (62) Division of application No. 14/784,700, filed as application No. PCT/US2014/034641 on Apr. 18, 2014, now Pat. No. 10,456,850.

(60) Provisional application No. 61/813,701, filed on Apr. 19, 2013.

(51) Int. Cl.
| | | |
|---|---|---|
| *B23K 9/02* | (2006.01) | |
| *B23K 9/025* | (2006.01) | |
| *B23K 9/23* | (2006.01) | |
| *B23K 35/02* | (2006.01) | |
| *B23K 35/38* | (2006.01) | |
| *B23K 35/28* | (2006.01) | |
| *B23K 1/19* | (2006.01) | |
| *B23K 26/211* | (2014.01) | |
| *B23K 26/323* | (2014.01) | |
| *B23K 10/02* | (2006.01) | |
| *B23K 26/322* | (2014.01) | |
| *B32B 3/26* | (2006.01) | |
| *B32B 7/12* | (2006.01) | |
| *B32B 15/01* | (2006.01) | |
| *B60R 19/34* | (2006.01) | |
| *B23K 103/10* | (2006.01) | |
| *B23K 103/20* | (2006.01) | |
| *B23K 103/16* | (2006.01) | |
| *B60R 19/18* | (2006.01) | |

(52) U.S. Cl.
CPC ............... *B23K 9/025* (2013.01); *B23K 1/19* (2013.01); *B23K 9/0203* (2013.01); *B23K 9/232* (2013.01); *B23K 10/02* (2013.01); *B23K 26/211* (2015.10); *B23K 26/322* (2013.01); *B23K 26/323* (2015.10); *B23K 35/0222* (2013.01); *B23K 35/0227* (2013.01); *B23K 35/0255* (2013.01); *B23K 35/0261* (2013.01); *B23K 35/28* (2013.01); *B23K 35/286* (2013.01); *B23K 35/38* (2013.01); *B23K 35/383* (2013.01); *B32B 3/266* (2013.01); *B32B 7/12* (2013.01); *B32B 15/012* (2013.01); *B60R 19/34* (2013.01); *B23K 2103/10* (2018.08); *B23K 2103/166* (2018.08); *B23K 2103/20* (2018.08); *B32B 2250/02* (2013.01); *B32B 2255/06* (2013.01); *B32B 2255/205* (2013.01); *B32B 2307/558* (2013.01); *B32B 2605/08* (2013.01); *B60R 2019/182* (2013.01); *B60R 2019/1826* (2013.01)

(58) Field of Classification Search
CPC .... B23K 9/025; B23K 9/232; B23K 35/0261; B23K 35/38; B23K 35/286; B23K 35/0222; B23K 35/0227; B23K 35/0255; B23K 35/28; B23K 35/383; B23K 1/19; B23K 26/211; B23K 26/323; B23K 9/0203; B23K 10/02; B23K 26/322; B60R 19/34; B32B 3/266; B32B 7/12; B32B 15/012
See application file for complete search history.

(56) References Cited

U.S. PATENT DOCUMENTS

| | | | |
|---|---|---|---|
| 6,253,989 B1 | 7/2001 | Bennett | |
| 2005/0129971 A1* | 6/2005 | Ping | B32B 15/012 428/615 |
| 2010/0098969 A1* | 4/2010 | Hashimura | B21J 15/025 428/653 |
| 2010/0224609 A1* | 9/2010 | Rose | B23K 9/022 219/137 R |
| 2013/0092667 A1* | 4/2013 | Peters | B23K 26/20 219/121.64 |

OTHER PUBLICATIONS

Martin, D. C., Method of Brazing Aluminum to Stainless Steel for High-Stress-Fatigue Applications. NASA. (Year: 1968).

* cited by examiner

*Primary Examiner* — John E Uselding
(74) *Attorney, Agent, or Firm* — Dickinson Wright PLLC (57) ABSTRACT

A method for joining a first part formed of an aluminum material to a second part formed of a steel material by metal inert gas welding and cold metal transfer is provided. An aluminum filler material forms a fillet joint between the parts and provides a structure for automotive body applications, such an aluminum bumper extrusion joined to a steel crush box connection. The first part includes a notch for hiding the start and end of the joint. A transition plate formed of a mixture of aluminum material and steel material can be disposed between the first part and the second part to provide the notch. The second part can include a mechanical fastener further joining the parts together. In another embodiment, the second part includes a plurality of dimples and is welded to the first part along the dimples.

13 Claims, 13 Drawing Sheets

JOINING OF DISSIMILAR MATERIALS

CROSS-REFERENCE TO PRIOR APPLICATIONS

This U.S. Divisional patent application claims the benefit of U.S. National Stage Patent application Ser. No. 14/784,700 filed Oct. 15, 2015 entitled "Joining of Dissimilar Materials," which claims the benefit of PCT International Patent Application Serial No. PCT/US2014/034641 filed Apr. 18, 2014 entitled "Joining Of Dissimilar Materials," which claims the benefit of U.S. Provisional Patent Application Ser. No. 61/813,701 filed Apr. 19, 2013, entitled "Joining of Dissimilar Materials," the entire disclosures of the applications being considered part of the disclosure of this application and hereby incorporated by reference.

BACKGROUND OF THE INVENTION

1. Field of the Invention

The invention provides a method for joining dissimilar materials, and structures including joined dissimilar materials.

2. Related Art

Body components for automotive vehicles oftentimes include dissimilar materials joined together to achieved optimal performance. For example, a bumper assembly can include an extrusion formed of aluminum material for connection to an impact beam, and a crush box connection formed of a steel material. The dissimilar materials are typically joined by self-piecing rivets and adhesive. This combination of dissimilar materials allows the bumper assembly to achieve sufficient strength and low weight requirements. However, the use of self-piecing rivets with ultra high strength steel (UHSS) is limited because holes for containing the rivets must be formed in the steel material. Currently, holes can be formed in steel material only if the strength of the steel material is less than 600 MPa. Thus, there remains a need for stronger, more efficient, and cost effective methods of joining dissimilar materials.

SUMMARY OF THE INVENTION

The invention provides a method for joining dissimilar materials with low heat input during the joining process and which provides a joint having exceptional strength. The method does not require forming holes in the steel material for rivets, and thus ultra high strength steel (UHSS) can be used with no limit on the material strength.

According to one embodiment, the method includes providing a first part formed of an aluminum material, and forming a notch in the first part. A second part formed of a steel material is then disposed along the first part. The method next includes joining the first part to the second part by a filler material, wherein the joining step begins and ends by disposing the filler material in the notch.

The invention also provides a method for joining dissimilar materials using a transition plate. This method includes providing a first part formed of an aluminum material and a second part formed of a steel material; and disposing a transition plate formed of a mixture of an aluminum material and a steel material between the first part and the second part. The transition plate includes a notch, and the first part is joined to the second part by a filler material extending along the transition plate, wherein the start and end of the joining step includes disposing the filler material in the notch.

The invention further provides a method for joining of dissimilar materials, comprising the steps of providing a first part formed of an aluminum material; providing a second part formed of a steel material; and forming a plurality of dimples along the surface of the second part. The method then includes joining the first part to the second part by welding along the dimples.

The invention also provides a structure including dissimilar materials, comprising a first part formed of an aluminum material and including a notch; and a second part formed of a steel material joined to the first part by a filler material. The joint provided by the filler material starts and ends in the notch.

Another structure provided by the invention includes a first part formed of an aluminum material, a second part formed of a steel material, and a transition plate formed of a mixture of an aluminum material and a steel material disposed between the first part and the second part. The transition plate includes a notch, and a filler material extends along the transition plate and joins the first part to the second part. The joint provided by the filler material starts and ends in the notch.

The invention further provides a structure comprising a first part formed of an aluminum material, and second part formed of a steel material welded to the first part, wherein the second part includes a plurality of dimples and is welded to the first part along the dimples.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 22A-23B show the first part and the second part with a T-joint formed therebetween according to other exemplary embodiments;

FIGS. 24A-28B illustrate reinforced structures provided by the first part and the second part according to other exemplary embodiments;

FIGS. 29A-30C illustrate structures including the first part spot welded to the second part by the filler material according to other exemplary embodiments.

DETAILED DESCRIPTION

Figure 1:
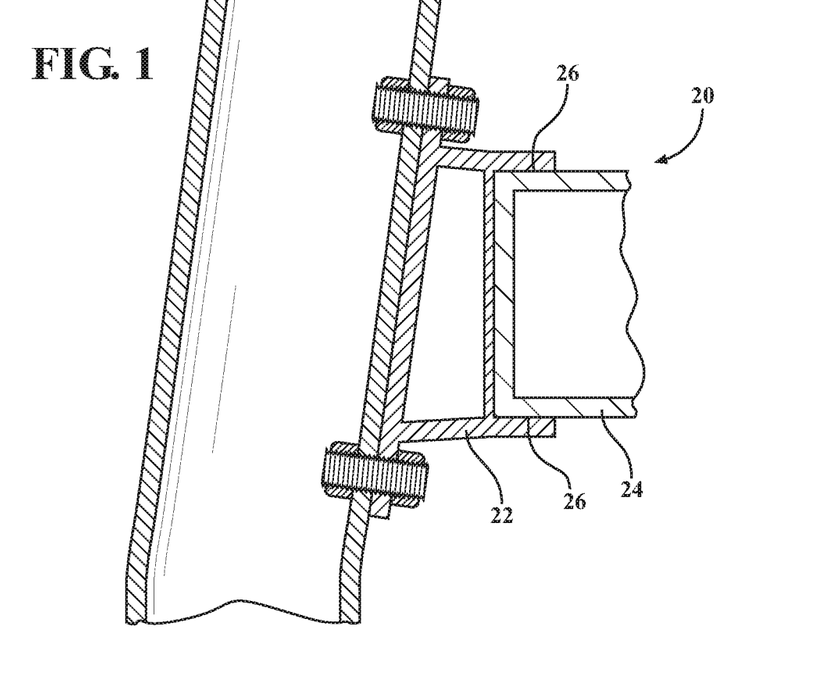
FIG. 1 is a top view of an exemplary bumper assembly.

The invention provides a method of joining dissimilar materials to form a structure 20, such as a first part 22 formed of an aluminum material joined to a second part 24 formed of a steel material. The method can provide a joint with exceptional tensile strength and requires low heat, compared to conventional joining methods. The method is typically used to form structures 20 for automotive body applications, such as bumper assemblies. FIG. 1 provides an exemplary bumper assembly, wherein the first part 22 is a bumper extrusion formed of aluminum, and the second part 24 is a crush box connection formed of steel. However, the structures 20 provided by the present invention can alternatively be used in various other automotive and non-automotive applications.

The method first includes providing the first part 22 formed of the aluminum material. The design and dimensions of the first part 22 depend on the application of the finished structure 20. For example, the first part 22 can be a sheet, plate, beam, or pillar of aluminum material. The first part 22 can be formed by a variety of different methods, for example casting or extrusion. In the embodiment of FIG. 1, the first part 22 is a bumper extrusion for connection to an impact beam.

The aluminum material of the first part 22 can be aluminum or any type of aluminum alloy, for example a 4000 series aluminum alloy. In one embodiment, the aluminum material is aluminum 6016, which comprises magnesium in an amount of 0.25 to 0.60 weight percent (wt. %); silicon in an amount of 1.0 to 1.5 wt. %; optional amounts of chromium, copper, iron, manganese, titanium and zinc; and aluminum in an amount of 96.4 to 98.8 wt. %. In one embodiment, the aluminum material is precipitation hardened and naturally aged, i.e. in the T4 state.

The method next includes providing the second part 24 formed of the steel material. The design and dimensions of the second part 24 depend on the application of the finished structure 20. For example, the second part 24 can be a plate, beam, or pillar of steel material. However, the thickness of the second part 24 is preferably 2 mm or less. The second part 24 can be formed by a variety of different methods, for example casting or extrusion.

The steel material of the second part 24 can be pure steel or any type of steel or steel alloy. For example, the steel material can be a boron steel, a dual phase (DP) steel, transformation induced plasticity (TRIP) steel, or ultra high strength steel (UHSS). A zinc coating having a thickness of at least 10 μm is preferably applied to the steel material.

Figure 1A:
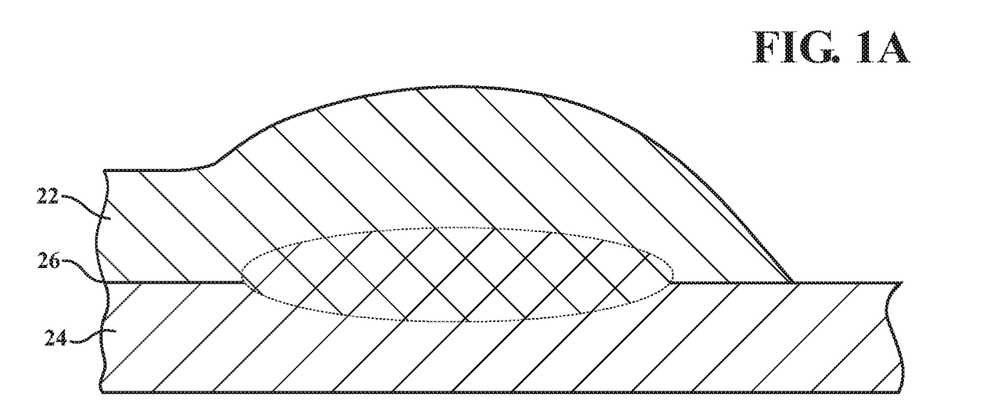
FIG. 1A is a magnified view of a portion of a joint that could be used in the bumper assembly of FIG. 1.

The method next includes disposing the second part 24 along the first part 22, and joining the first part 22 to the second part 24 by a filler material 26. FIG. 1A is a magnified view of a joint formed by the filler material 26, which can be located between the first part 22 and the second part 24 of FIG. 1. The filler material 26 used to join the first part 22 and the second part 24 is preferably an aluminum material, which can be the same or different as the aluminum material of the first part 22. In one exemplary embodiment, the filler material 26 is a 4000 series aluminum alloy. However, the filler material 26 can alternatively be formed of a different material capable of joining the first part 22 and the second part 24, instead of an aluminum material.

The step of joining the first part 22 and the second part 24 by the filler material 26 typically includes welding, such as arc welding, plasma welding, laser welding, or spot welding. The filler material 26 is typically a molten metal applied to the interface between the first part 22 and the second part 24. When the filler material 26 is a molten aluminum material, the joining step typically includes welding the first part 22 to the filler material 26, and brazing the second part 24 to the filler material 26. If the parts are welded, the welding temperature is high enough to melt the filler material 26 and the first part 22, which are both typically formed of aluminum and have similar melting points, such that a weld is formed between the first part 22 and the filler material 26. The welding temperature, however, is less than the melting point of the second part 24 formed of the steel material. Thus, the second part 24 acts as a heat sink, and a braze joint forms between the second part 24 and the filler material 26. FIG. 1A shows the weld between the aluminum filler material 26 and the first part 22, and the braze joint between the aluminum filler material 26 and the second part 24. The joint between the first part 22 and the second part 24 formed by the filler material 26 is typically a fillet joint. In addition, at least one of an adhesive and a sealant can be applied to the first part 22 and the second part 24 prior to joining with the filler material 26. The adhesive provides additional strength, and the sealant prevents corrosion.

Figure 2:
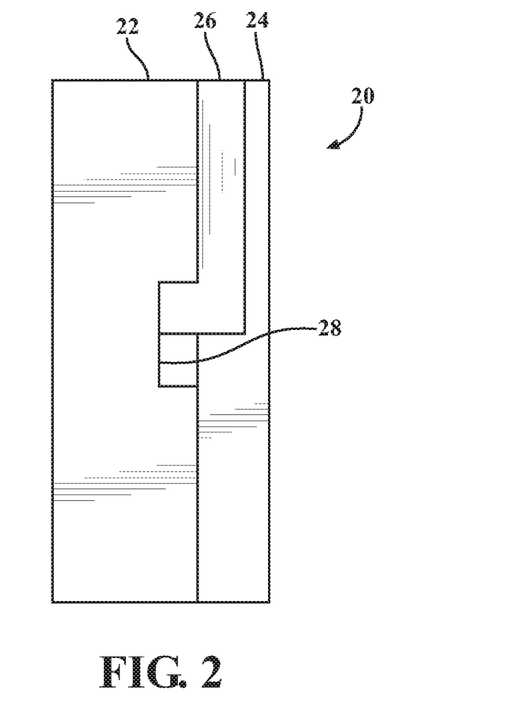
FIG. 2 shows a first part with a notch and a second part joined to the first part by a filler material according to one exemplary embodiment, wherein the joint begins in the notch.

The method of joining the first part 22 and the second part 24 preferably includes hiding the start and end of the joint formed by the filler material 26, so that the joint does not begin or terminate in the load path. The start and end of the joint is hidden by forming a notch 28 in the first part 22 prior to joining with the filler material 26. The joining step then begins by disposing the filler material 26 in the notch 28, and applying the filler material 26 along the interface of the first part 22 and the second part 24. This technique can be used with any type of welding or brazing method. FIG. 2 shows the start of the joint, wherein the filler material 26 is disposed in the notch 28 of the first part 22, but the end of the joint is not yet disposed in the notch 8. The joining step ends by again disposing the filler material 26 in the notch 28. Therefore, the joint along the interface between the first part 22 and the second part 24 is continuous and provides enhanced strength, compared to joints that begin or terminate along the load path. The first part 22 can also include a plurality of the notches 28, for example if the structure 20 includes multiple joints spaced from one another.

Figure 3:
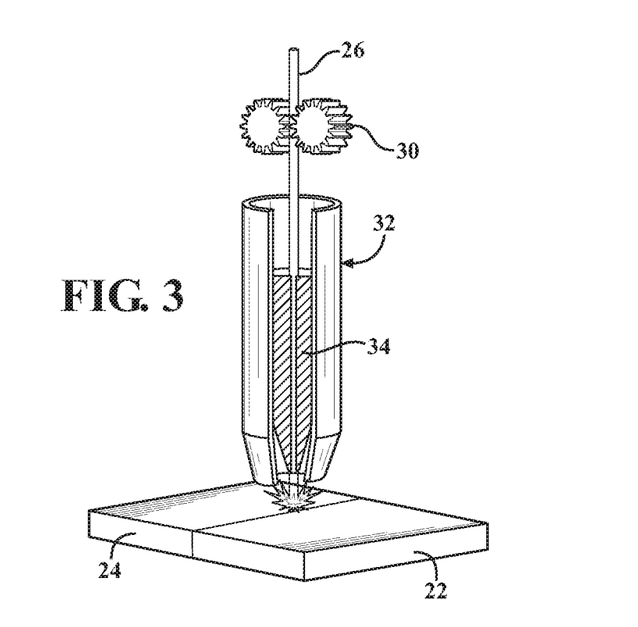
FIG. 3 is an exemplary welding gun used for a metal inert gas (MIG) welding and cold metal transfer (CMT) process.

In one preferred embodiment, the step of joining the first part 22 and the second part 24 by the filler material 26 includes metal inert gas (MIG) welding with a cold metal transfer (CMT) process. An exemplary welding apparatus for performing MIG welding with CMT is shown in FIG. 3. The MIG welding step includes protecting the parts 22, 24 from atmospheric gases, such as nitrogen and oxygen, by disposing the first part 22 and the second part 24 against one another in an atmosphere containing a shielding gas, such as argon, helium, or another inert gas.

The MIG welding step further includes providing a wire formed of the filler material 26. A wire feed 30 conveys the wire from a spool or drum to a welding gun 32, as shown in FIG. 3. The welding gun 32 includes a contact tip 34 which receives the wire and directs the wire toward the parts 22, 24 to be joined. The wire extends to a free end located at the end of the contact tip 34. The free end of the wire faces and is spaced from the parts 22, 24 to be joined. Either the contact tip 34 or the first and second metal parts 22, 24 are grounded, and a power supply provides energy in the form of an electric current to the wire to form an arc between the wire and the parts 22, 24 to be joined. The current applied to the wire causes the free end of the wire to melt, and the melted filler material 26 is continuously applied along the interface of the first part 22 and the second part 24. The melted filler material 26 from the wire then solidifies to form the joint. The MIG welding step is typically conducted with the CMT process, but MIG welding can be conducted without the CMT process.

The CMT process can be used with various types of welding, but is typically used with MIG welding or another kind of arc or plasma welding. The CMT process includes providing electric current to the wire of filler material 26 to form an arc between the wire and the part to be joined, as typically done with MIG welding. However, instead of continuously applying the wire of filler material 26 from the welding gun 32 to the interface of the parts 22, 24, the method instead includes retracting the wire away from the interface each time a short circuit occurs. The retracting steps occur at a high frequency to provide a plurality of droplets of the filler material 26 along the interface of the parts 22, 24. During the CMT process, the wire moves up to 90 times per second. Thus, the arc formed between the wire and the parts 22, 24 provides heat for only a brief period of time. The droplets of filler material 26 blend together along the interface and solidify to provide a continuous joint. The CMT process also provides other advantages, such as no splatter and higher precession. The CMT process can be robotic or manual.

Figure 4:
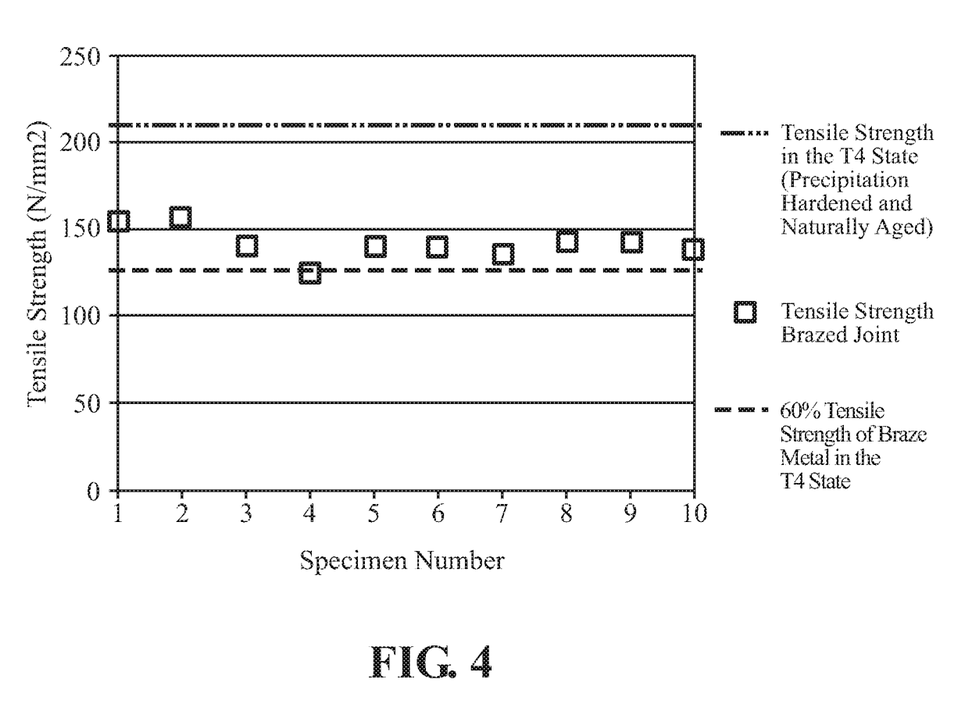
FIG. 4 is a chart comparing the tensile strength of a joint to the tensile strength of an aluminum material in a T4 state according to one exemplary embodiment.

The method of joining the first part 22 and the second part 24 using MIG welding with the CMT process also provides a joint with exceptional strength. The joint formed by the filler material 26 has a tensile strength equal to about 60% of the tensile strength of the first part 22 formed of aluminum material, when the aluminum material is precipitation hardened and naturally aged, i.e. in the T4 state. In addition, the length and width of the joint formed by the MIG/CMT process is greater than the length and width of conventional weld joints. FIG. 4 provides test data showing the tensile strength of the joint compared to the aluminum material in a T4 state. The tensile strength of the joint is approximately 150 N/mm².

A mechanical fastener 36 can also join the first part 22 to the second part 24, in addition to the joint provided by the filler material 26. The mechanical fastener 36 is typically a separate component, independent of the first part 22 and the second part 24. However, alternatively, a portion of the second part 24 can provide at least a portion of the fastener 36. In one embodiment, the portion of the second part 24 providing the mechanical fastener 26 extends through the first part 22. FIGS. 5-16 provide exemplary embodiments of the first part 22 joined to the second part 24 by the filler material 26 and the mechanical fastener 36. In the embodiments of FIGS. 5-16, the first part 22 is a plate formed of the aluminum material, and the second part 24 comprises a plate or another component formed of the zinc-coated steel material. The fastener 36 can also have various different designs and dimensions. In the embodiments of FIGS. 5-16, the start and end of the joint formed by the filler material 26 is preferably hidden, as in the embodiment of FIG. 2.

Figure 5:
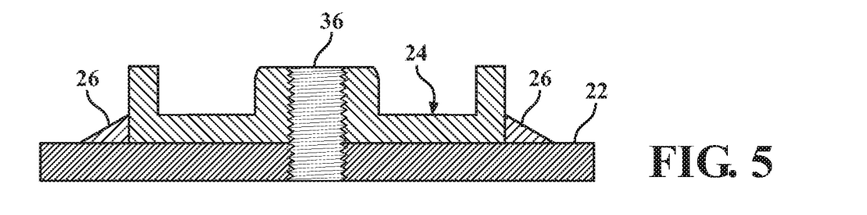
FIGS. 5-16 are cross-sectional views of the first part joined to the second part by a mechanical fastener and a fillet weld according to exemplary embodiments.

In the embodiment of FIG. 5, the fastener 36 extends through the first part 22 and the second part 24. The first part 22 is an aluminum plate, the second part 24 is a zinc-coated steel nut with a hex head and an outer flange, and the mechanical fastener 36 is a zinc-coated steel bolt. The steel nut and bolt can be threaded or unthreaded, and can have various different diameters, such as 5 mm, 6 mm, 8 mm, 10 mm, or 12 mm. The steel nut is disposed on the aluminum plate, and the steel bolt extends through the hex head of the nut and into the aluminum plate. In another embodiment, shown in FIG. 6, the zinc-coated steel bolt engages the aluminum plate, but does not extend through the aluminum plate. The embodiment of FIG. 7 is similar to the embodiment of FIG. 5, except the zinc-coated steel nut is key cut. In the embodiments of FIGS. 7-9, the steel bolt extends through the aluminum plate. In the embodiment of FIGS. 8 and 9, a portion of the steel nut also extends through the aluminum plate around the steel bolt.

Figure 6:
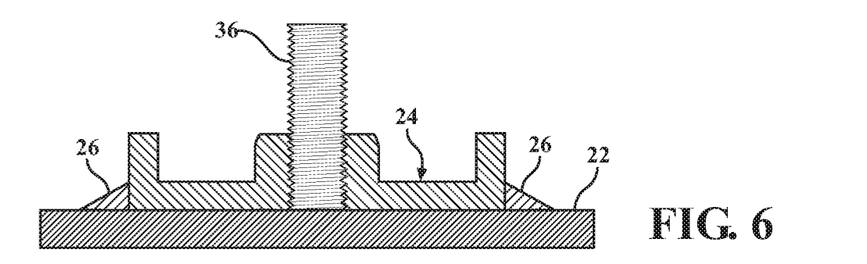
Figure 7:
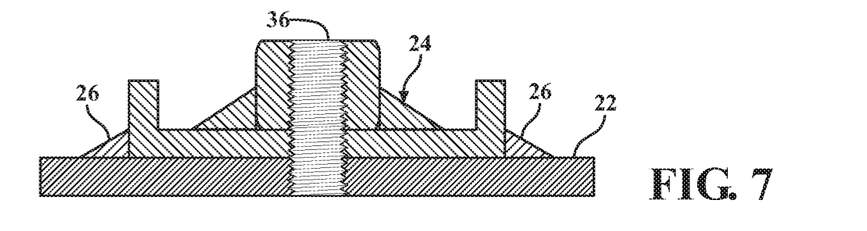
Figure 8:
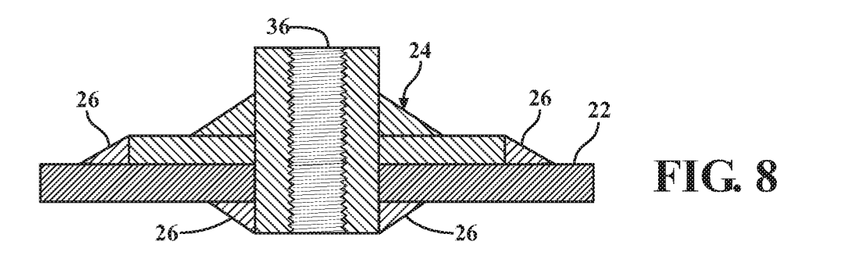
Figure 9:
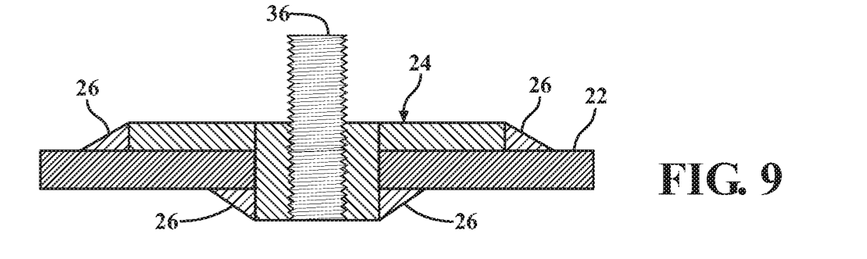

Also in each of the embodiments of FIGS. 5-9, the filler material 26 forms a fillet joint between the aluminum plate and the outer flange or side of the steel nut. The fillet joint preferably has a maximum area of about 2 mm, and the outer flange or side of the steel nut has a width capable of supporting the fillet joint. In the embodiments of FIGS. 5-7, the fillet joint is formed on one side of the aluminum plate, but in the embodiments of FIGS. 8 and 9, the fillet joint is formed on both sides of the aluminum plate.

Figures 10, 11:
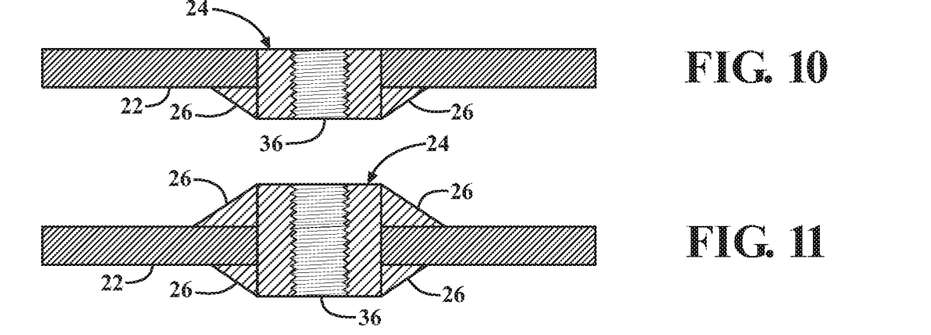
Figure 12:
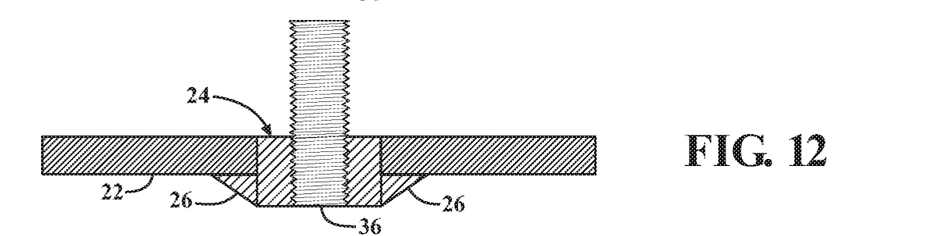

FIGS. 10-12 provide other exemplary mechanical fasteners 36 that can be used along with the fillet joint formed by the filler material 26. The second part 24 provides at least a portion of each fastener 36 of FIGS. 10-12. These fasteners 36 are preferably formed of a steel material with a zinc coating, and they can be threaded or unthreaded.

In the embodiment of FIG. 10, the fastener 36 is a flush mount nut extending through the aluminum plate. One end of the flush mount nut is aligned with a side surface of the aluminum plate, and the other end of the nut extends outwardly of the opposite side surface of the aluminum plate. The fillet joint provided by the filler material 26 is located between the aluminum plate and the outwardly extending portion of the nut.

In the embodiment of FIG. 11, the fastener 36 is a standoff nut extending through the aluminum plate. The standoff nut extends outwardly of both side surfaces of the aluminum plate, and the fillet joint is located along the surface of the standoff nut, on both sides of the aluminum plate.

In the embodiment of FIG. 12, the fastener 36 is a barrel bolt extending through the aluminum plate. The head of the bolt is disposed in the opening of the aluminum plate, and a portion of the head extends outwardly of the aluminum plate on one side of the aluminum plate. The other end of the bolt extends outwardly of the opposite side of the aluminum plate. The fillet joint is located between the head of the bolt and the aluminum plate.

Figure 13:
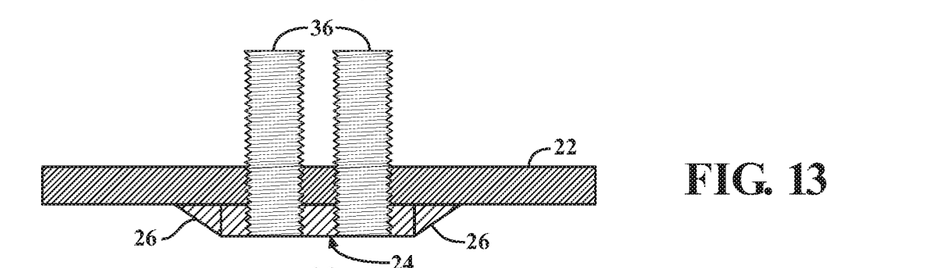
Figure 14:
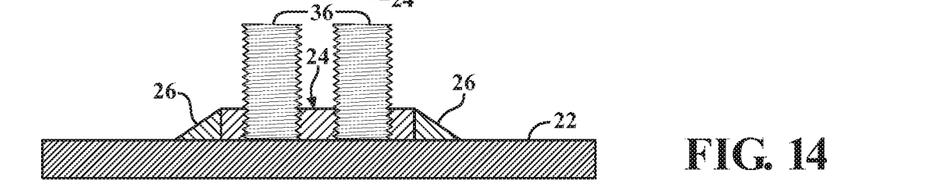
Figure 15:
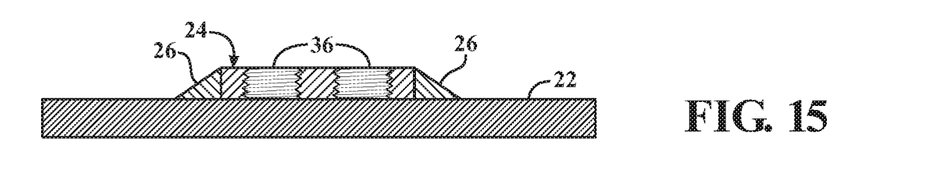

FIGS. 13-16 provide other exemplary embodiments wherein the first part 22 is an aluminum plate, the second part 24 is a steel plate, and the fasteners 36 are bolts. The second part 24 may also be referred to as a fastener plate. The plate and bolts of FIGS. 13-15 are also preferably formed of the steel material with a zinc coating, and can be threaded or unthreaded. The fastener plate provides improved alignment to the bolts or nuts in any combination.

FIGS. 13 and 14 show the second part 24, referred to as the fastener plate, on one side of the aluminum plate aligning a pair of barrel bolts. In FIG. 13, the barrel bolts extend through the fastener plate and the aluminum plate; and in FIG. 14, the barrel bolts extend through the fastener plate and engage the aluminum plate. The fillet joint provided by the filler material 26 is formed between the side of the fastener plate and the top surface of the aluminum plate.

Figure 16:
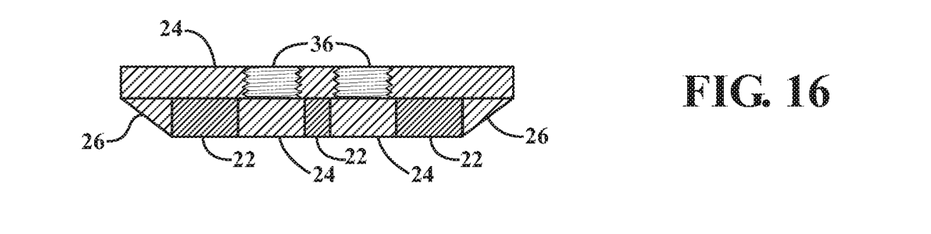

In the embodiments of FIGS. 15 and 16, the fastener plate is extruded and disposed on the aluminum plate. In the embodiment of FIG. 15, the fastener 36 includes a pair of bolts extending through the fastener plate and engaging the top surface of the aluminum plate. The top of each bolt is aligned with the top surface of the fastener plate, and the fillet joint is formed between the sides of the fastener plate and the top surface of the aluminum plate. In the embodiment of FIG. 16, the fastener 36 includes a pair of bolts extending through the fastener plate and through the aluminum plate. The top of each bolt is aligned with the top surface of the fastener plate, and the bottom of each bolt is aligned with the bottom surface of the aluminum plate. The diameter of each bolt increases along the aluminum plate. The fillet joint is formed between the bottom surface of the fastener plate and the side of the aluminum plate.

Figure 17A:
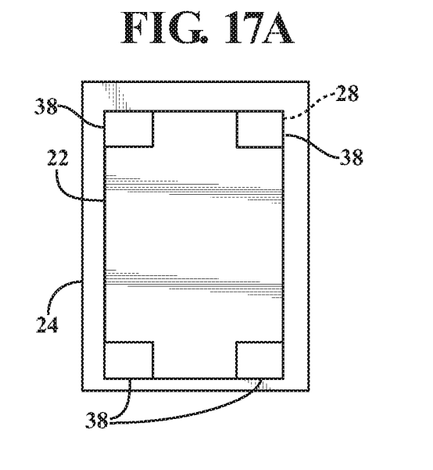
FIG. 17A is a top view of a transition plate disposed between the first part and the second part according to another exemplary embodiment.
Figure 17B:
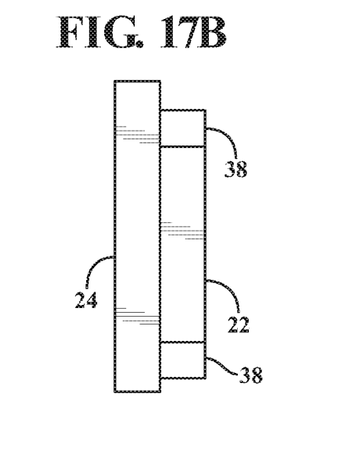
FIG. 17B is a side view of the structure of FIG. 17A.

In yet another embodiment, the method includes disposing a transition plate 38 between the first part 22 and the second part 24, as shown in FIGS. 17A and 18B, prior to joining the first part 22 and the second part 24 with the filler material 26. In this embodiment, the first part 22 is an aluminum plate and the second part 24 is a steel plate. FIG. 17A is a top view, and FIG. 17B is a side view of the transition plate 38 and the parts 22, 24. The transition plate 38 is preferably formed of a mixture of an aluminum material and a steel material, and more preferably the transition plate 38 is formed of the same materials used to form the first part 22 and the second part 24. The transition plate 38 provides the interface between the first part 22 and the second part 24, and the joint extends along the transition plate 38. In this embodiment, the notch 28 for hiding the start and end of the joint can be formed in the transition plate 38, as shown in FIG. 17A, instead of in the first part 22. The transition plate 38 is preferably used in combination with MIG welding, spot welding, or riveting. The thickness and strength of the transition plate 38 can be tailored to meet the mechanical connection required. In addition, when the transition plate 38 is used, the steel plate can be tapped.

The invention also provides a structure 20 including parts 22, 24 formed of dissimilar materials and joined together. The structure 20 includes the first part 22 formed of the aluminum material and the second part 24 formed of the steel material joined together by the filler material 26. In one embodiment, the first part 22 includes the notch 28, and the joint starts and ends in the notch 28. In another embodiment, wherein the structure 20 includes the transition plate 38 with the notch 28, the joint starts and ends in the notch 28 of the transition plate 38. Therefore, the joint along the interface between the first and second parts 22, 24 is continuous and provides enhanced strength, compared to joints that begin or terminate along the load path. The filler material 26 preferably forms a fillet joint between the first part 22 and the second part 24. When the MIG/CMT process is used to form the joint, the filler material 26 is welded to the first part 22 and brazed to the second part 24.

The first part 22 and the second part 24 can comprise various different other designs and dimensions, so that the finished structure 20 can be used in various different applications. FIGS. 18-30C show other exemplary structures 20 having various different designs.

Figure 18:
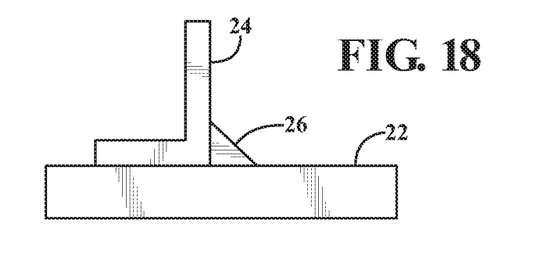
FIGS. 18-20 are side views of the first part, the second part, and the filler material forming a coach joint according to exemplary embodiments.
Figure 19:
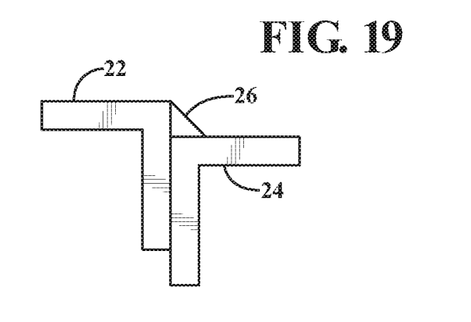
Figure 20:
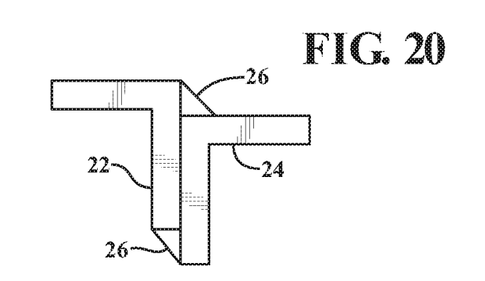
Figure 21:
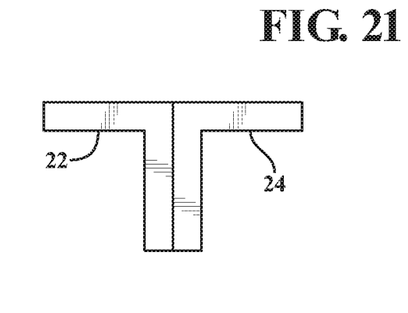
FIG. 21 is a side view of the first part and the second part prior to forming a coach joint therebetween.

In the embodiment of FIG. 18, the first part 22 is a plate formed of aluminum, the second part 24 is an L-shaped bracket formed of steel, and the filler material 26 provides a fillet joint therebetween. In the embodiments of FIGS. 19-21, the first part 22 is an L-shaped bracket formed of aluminum, the second part 24 is an L-shaped bracket formed of steel, and the brackets face opposite one another. In the embodiment of FIG. 19, the brackets are offset from one another, and the filler material 26 joins the side surface of the aluminum bracket to the top surface of the steel bracket to provide an offset coach joint. In the embodiment of FIG. 20, the brackets also provide an offset coach joint, but the filler material 26 joins the side surface of the steel bracket to the bottom surface of the aluminum bracket, in addition to joining the side surface of the aluminum bracket to the top surface of the steel bracket. In the embodiment of FIG. 21, the brackets are vertically aligned and face opposite one another. The interface between the brackets can be rounded along the top surfaces, and the filler material 26 can be disposed between the rounded surfaces of the aluminum bracket and the steel bracket to form a true coach joint.

Figure 22A:
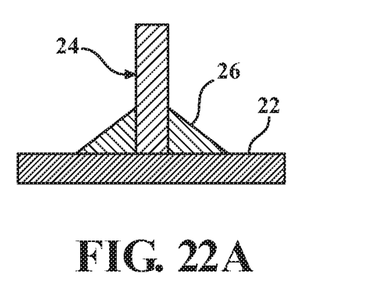
Figure 22B:
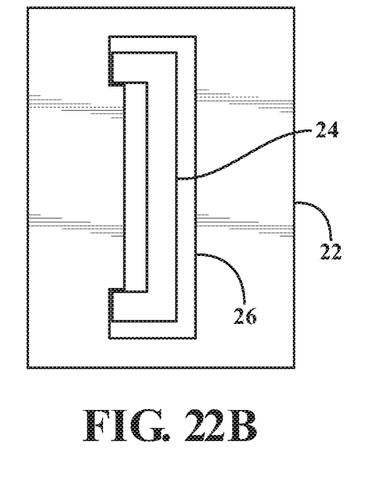
Figure 23A:
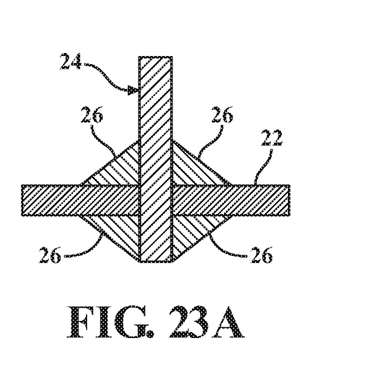
Figure 23B:
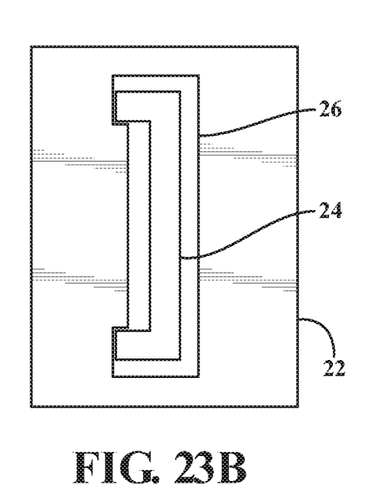

In the embodiment of FIGS. 22A and 22B, the first part 22 is an aluminum plate and the second part 24 is a steel plate, and the steel plate is disposed perpendicular to the aluminum plate. The filler material 26 surrounds the base of the steel plate and forms a fillet joint therebetween. In the embodiment of FIGS. 23A and 23B, the steel plate extends through the aluminum plate, and the filler material 26 forms a fillet joint between the steel plate and aluminum plate, on both sides of the aluminum plate.

FIGS. 24A-29B show examples of reinforced structures 20 each including the first part 22 and the second part 24 joined by the filler material 26. The method used to join the first part 22 to the second part 24 and provide the reinforced structure 20 is preferably MIG welding with the CMT process.

Figure 24A:
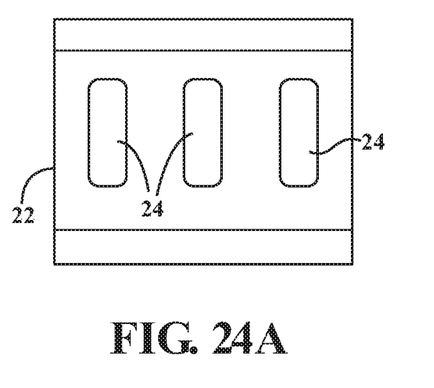
Figure 24B:
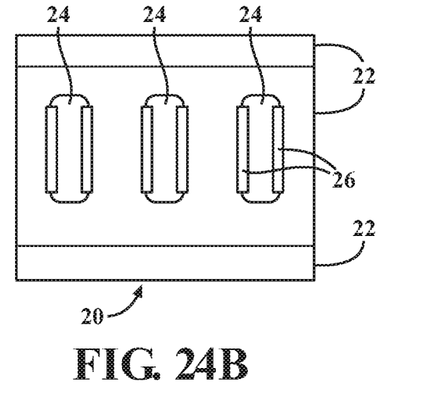
Figure 24C:
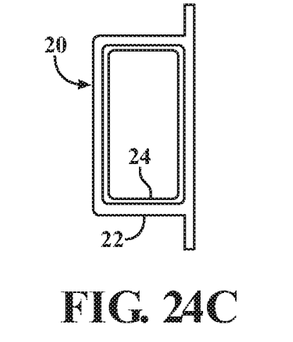
Figure 25A:
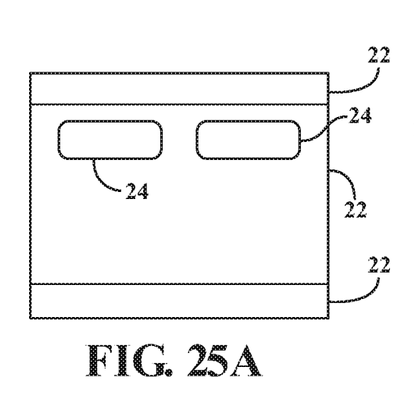
Figure 25B:
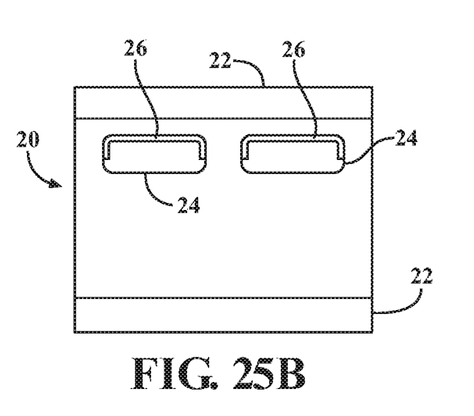
Figure 26A:
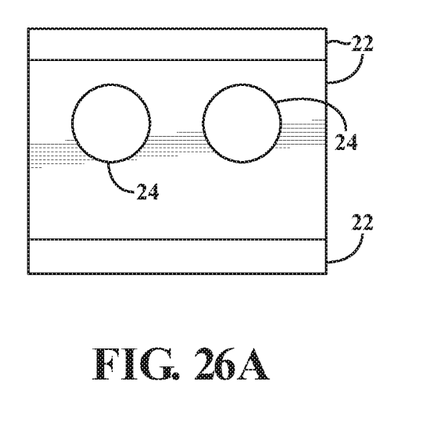
Figure 26B:
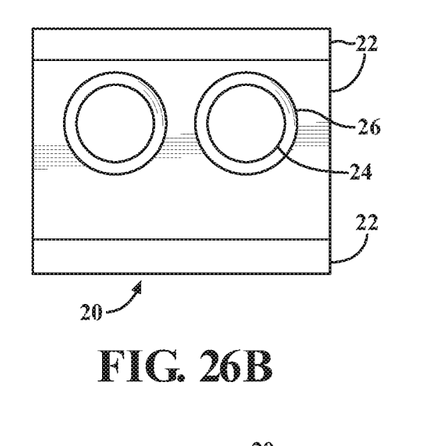
Figure 26C:
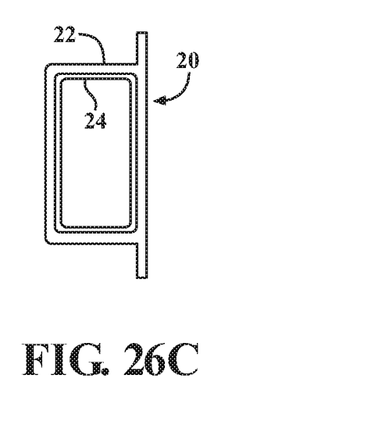
Figure 26D:
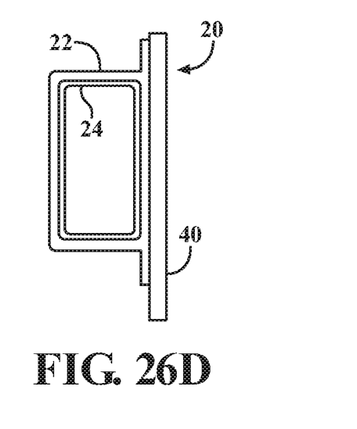

In the embodiments of FIG. 24A-26B, the first part 22 is an aluminum extrusion presenting a hollow opening and including a plurality of slots or holes extending through a wall of the extrusion. The second part 24 is a steel tube, and the steel tube slides into the hollow opening of the aluminum extrusion. The filler material 26 joins the aluminum extrusion to the steel tube along each slot or hole. In the embodiment of FIGS. 24A and 24B, the slots extend vertically along the wall of the aluminum extrusion, and the filler material 26 forms a stich on each side of each slot. FIG. 24A shows the aluminum extrusion and steel tube before joining, FIG. 24B shows the structure 20 after joining, and FIG. 24C is a top view of the structure 20. The embodiment of FIGS. 25A and 25B is the same as the embodiment of FIGS. 24A-24C, except for the slots in the aluminum extrusion extend horizontally instead of vertically, and the filler material 26 extends continuously around a portion of each slot. FIGS. 26A-26C show another embodiment, similar to the embodiments of FIGS. 24 and 25, except for the slots are circular, and the filler material 26 extends continuously around the circumference of each slot. FIG. 26D is an alternate embodiment, wherein a reinforcement plate 40 formed of high strength steel supports the aluminum extrusion. The structures 20 can alternatively comprise other designs, wherein the first part 22 surrounds the second part 24 and includes slots or holes exposing the second part 24, and wherein the joint is disposed along the slots or holes.

Figure 27A:
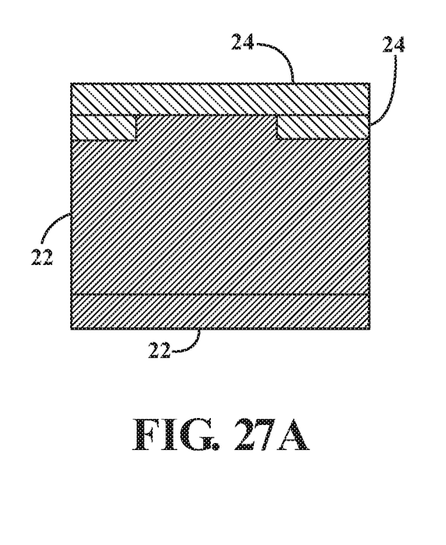
Figure 27B:
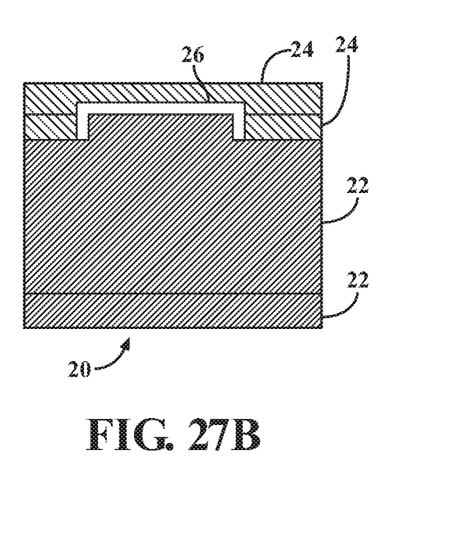

FIGS. 27A-27B show another reinforced structure 20, wherein the first part 22 is aluminum and the second part 24 is steel. The first part 22 is a block including a platform along one surface, and the second part 24 is a plate including a groove for receiving the platform, as shown in FIG. 27A. The filler material 26 is disposed along the ledge to form the joint, as shown in FIG. 27B.

Figure 28A:
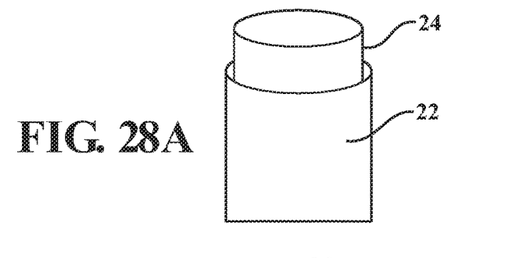
Figure 28B:
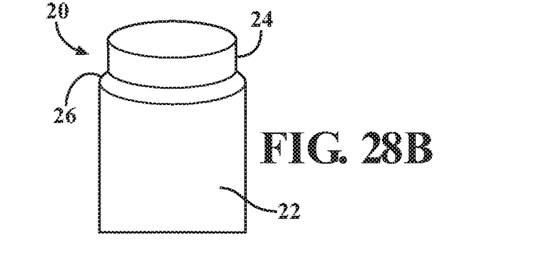
Figure 29A:
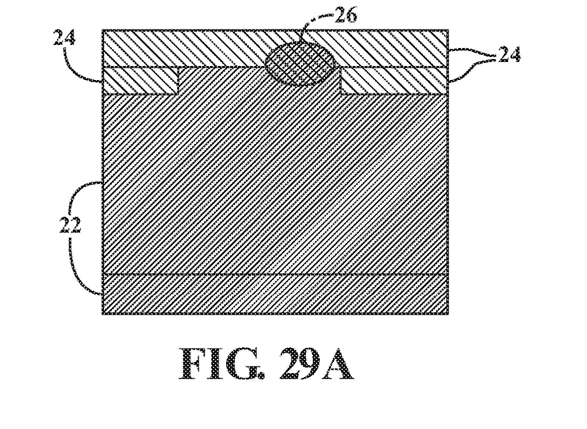
Figure 29B:
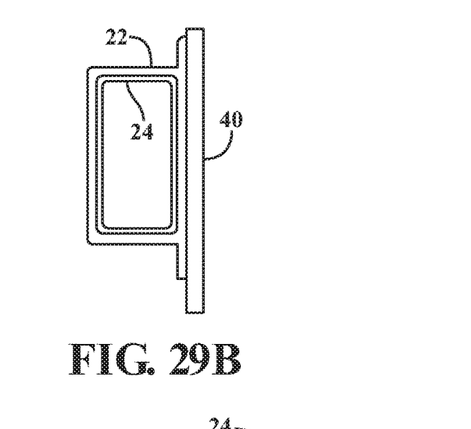

In the embodiment of FIGS. 28A and 28B, the first part 22 is a tube formed of aluminum, and the second part 24 is a tube formed of the zinc-coated steel. The diameter of the steel tube is less than the diameter of the aluminum tube, and the steel tube slides into the aluminum tube. The steel tube extends outwardly of the aluminum tube, and the filler material 26 extends continuously around the circumference of the aluminum tube to form a joint therebetween. The tubes are shown as having a cylindrical shape, but alternatively can have a round, square, rectangular, hexagonal, shape. The second part 24 can also be a rod formed of the steel material. FIG. 28A shows the parts 22, 24 before joining, and FIG. 28B shows the parts 22, 24 after joining.

Figure 30A:
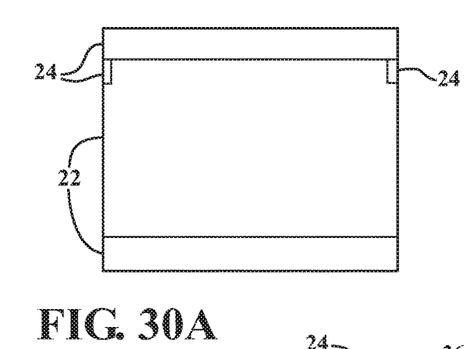
Figure 30B:
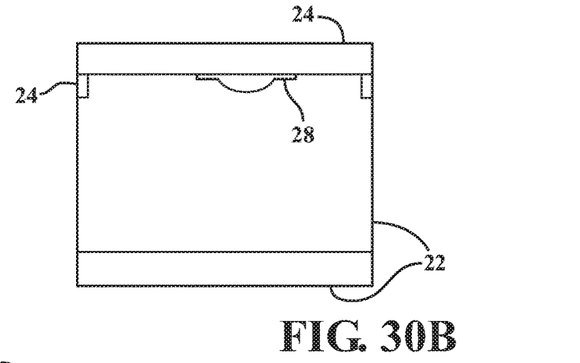
Figure 30C:
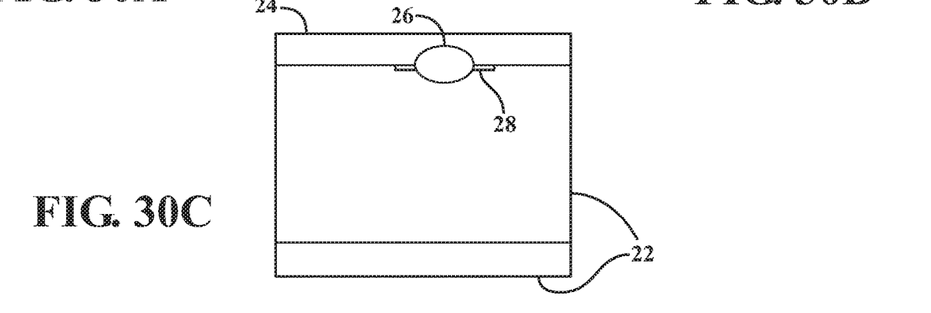

FIGS. 29A-30C illustrate another embodiment, wherein the filler material 26 forms spot tack at a single point along the interface between the two parts 22, 24, instead of a joint extending continuously along the interface. The spot tack is typically used in combination with an adhesive between the two parts 22, 24. For example, the spot tacks can be disposed throughout the structure 20 to provide rigidity until the adhesive takes hold. The structure 20 can also include the reinforcement plate 40. In FIGS. 30A-30C, the notch 28 is formed in the first part 22, and the spot tack is disposed in the notch 28, so that the spot tack is out of the shear plane of the joint. The notch 28 preferably includes a radius to increase the attachment area.

Figure 31:
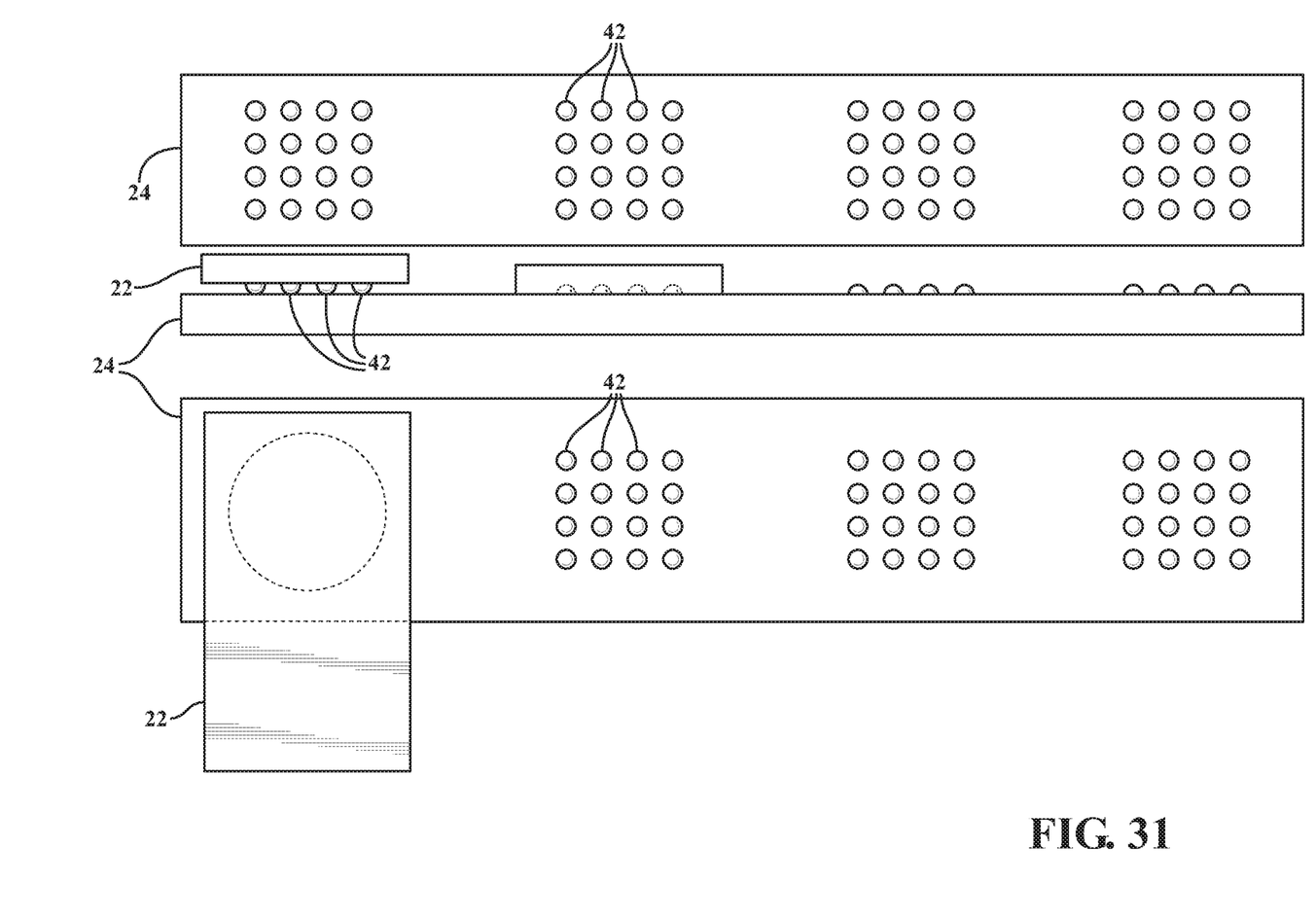
FIGS. 31-33 illustrate structures including the second part welded to the first part, wherein the second part has a plurality of laser dimples to increase the shear strength of the joint.
Figure 32:
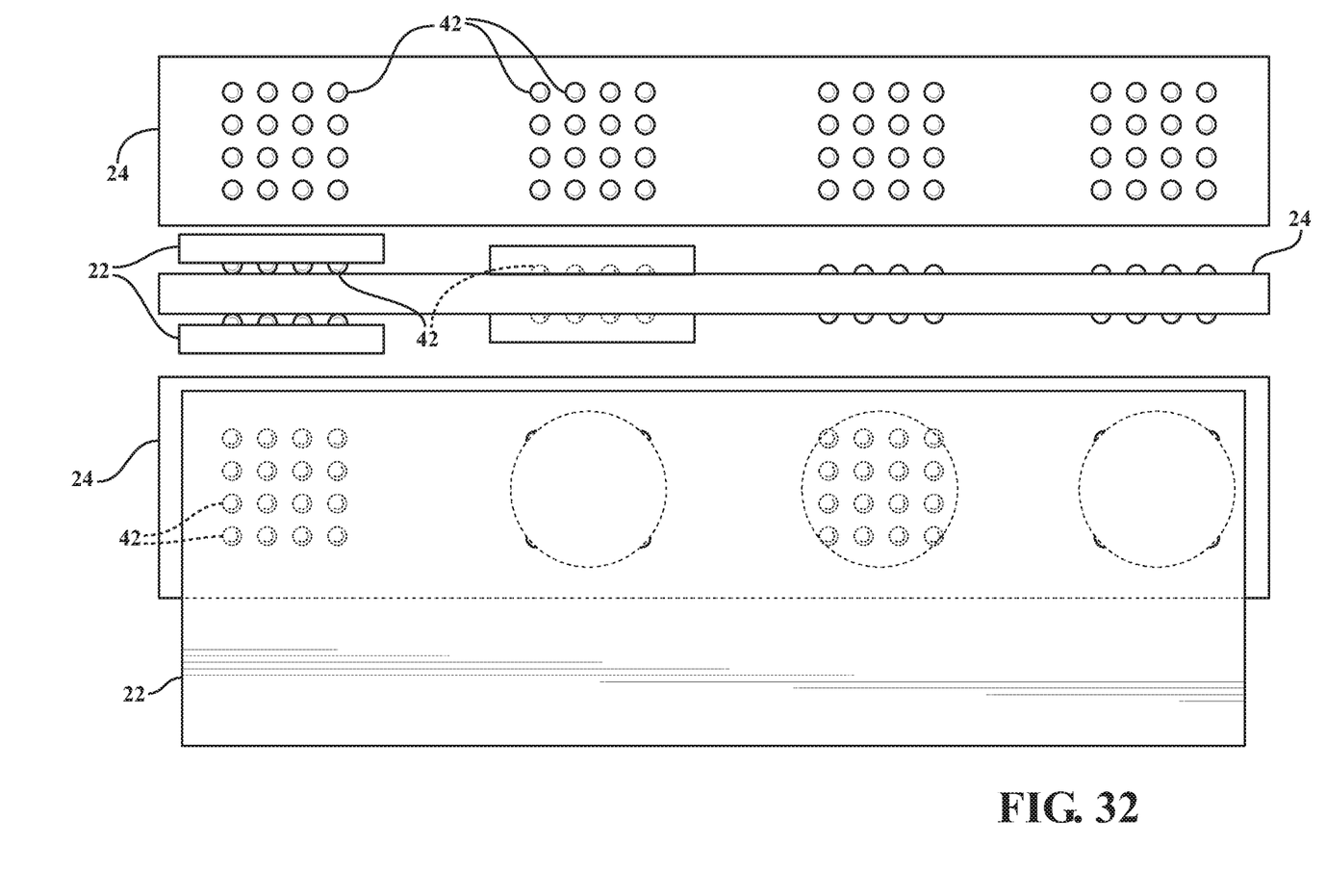

FIGS. 31 and 32 illustrate yet another embodiment which provides increased shear strength of the joint between the two parts 22, 24. The method of this embodiment includes forming a plurality of dimples 42 or raised surfaces along the second part 24, prior to spot welding the first part 22 to the second part 24 along the dimples 42 or raised surface areas, without use of the filler material 26. A laser is typically used to form the dimples 42 along the surface of the second part 24 at a rate of 12 dimples per second. The dimples 42 can be disposed in a plurality of clusters, wherein each cluster includes 12 dimples 42 and the dimples 42 are spaced from one another by 1 mm. Alternatively, knurling or a pin punch can be used to create raised surfaces along the second part 24, instead of laser dimpling. The spot welding step applied to the dimpled or raised surface areas can be a 2T process, as shown in FIG. 31, or a 3T process, as shown in FIG. 32. Adhesive can also be applied to the parts 22, 24, but is not required.

The process shown in FIGS. 31 and 32 allows for non-destructive testing (NDT) inspection. In addition, during spot welding, the aluminum complies with the steel and the steel acts as a heat source. The dimpled or raised steel surface locks into the melted aluminum while under force and while conduction occurs during the spot welding step. When the steel surface temperature rises to about 600° C., the aluminum liquefies and the steel dimples 42 or raised surfaces are embedded in the aluminum material. The aluminum material then solidifies and remains locked to the steel material.

Figure 33:
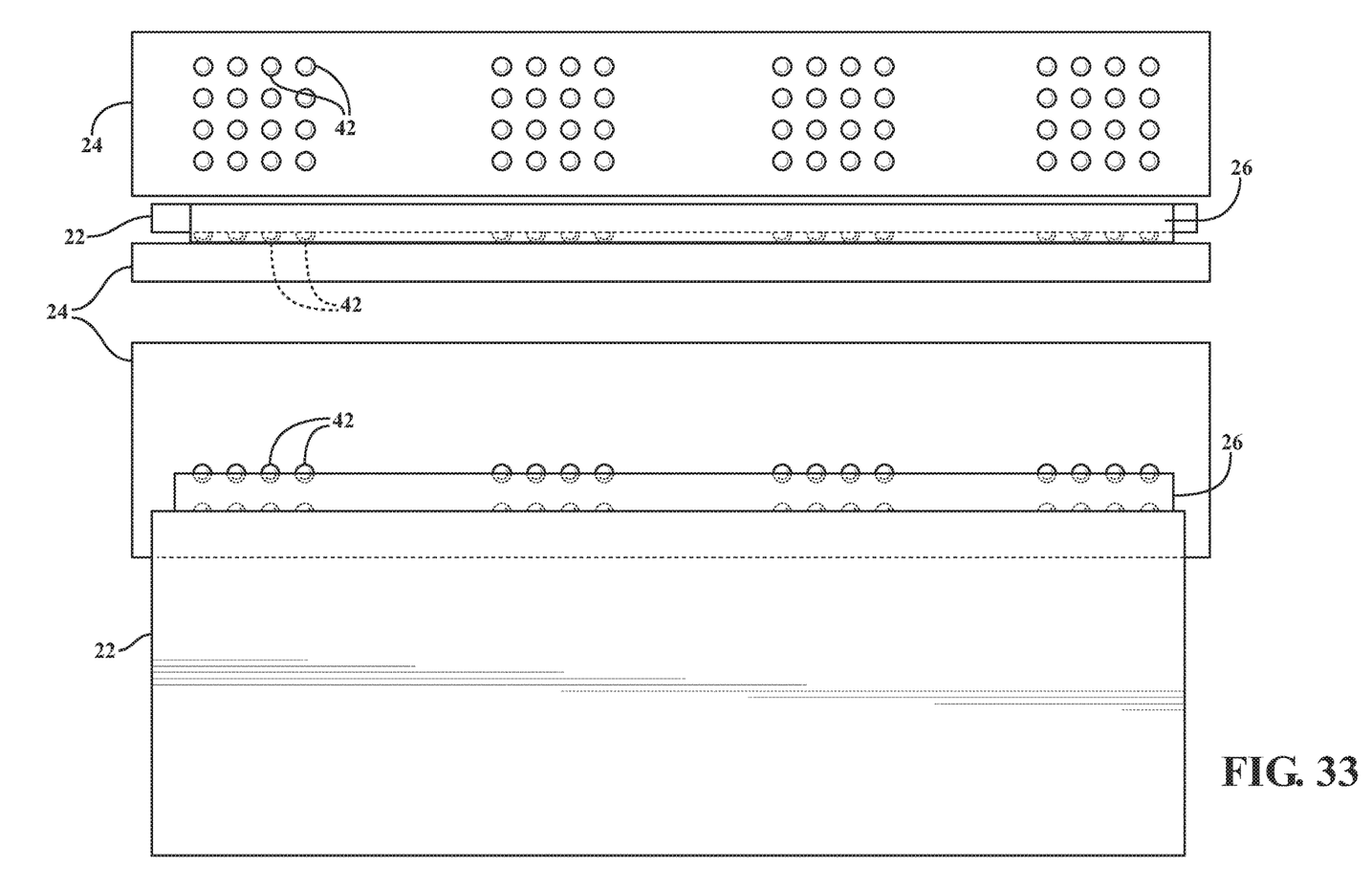

FIG. 33 illustrates another embodiment, wherein the shear strength of the joint provided by the aluminum filler material 26 is increased by forming the dimples 42 or raised surfaces along the steel second part 24 prior to welding the first part 22 to the second part 24, preferably by MIG welding. The molten aluminum filler material 26 is applied to the dimpled or raised steel surface of the second part 24 to create fillet joint. An embedded lock forms between the aluminum filler material 26 and the steel second part 24 once the aluminum solidifies.

Obviously, many modifications and variations of the present invention are possible in light of the above teachings and may be practiced otherwise than as specifically described while within the scope of the appended claims.

What is claimed is:

1. A method for joining of dissimilar materials, comprising:
providing a first part formed of an aluminum material;
providing a second part formed of a steel material;
disposing a transition plate formed of a mixture of aluminum material and steel material between the first part and the second part, wherein the transition plate includes a notch; and
joining the first part to the second part by a filler material extending along the transition plate, wherein the start and end of the joining step includes disposing the filler material in the notch.

2. The method of claim 1, wherein the joining step includes a cold metal transfer process, and the cold metal transfer process includes providing a wire of the filler material having a free end spaced from the transition plate;
providing an electric current to the wire to melt the free end of the wire and form an arc between the wire and the transition plate; and
retracting the wire away from the transition plate each time a short circuit occurs to form a plurality of droplets of the filler material.

3. A method for joining of dissimilar materials, comprising:
providing a first part formed of an aluminum material;
providing a second part formed of a steel material;
forming a plurality of dimples along the surface of the second part; and
joining the first part to the second part by welding along the dimples.

4. The method of claim 3, wherein the joining step includes a cold metal transfer process, and the cold metal transfer process includes providing a wire of the filler material having a free end spaced from the first part and the second part;
providing an electric current to the wire to melt the free end of the wire and form an arc between the wire and the parts; and
retracting the wire away from the parts each time a short circuit occurs to form a plurality of droplets of the filler material.

5. A structure including dissimilar materials, comprising:
a first part formed of an aluminum material and including a notch; and
a second part formed of a steel material joined to said first part by a filler material, wherein a joint provided by said filler material starts and ends in said notch.

6. The structure of claim 5, wherein said second part includes a zinc coating on said steel material.

7. The structure of claim 5, wherein said first part is a bumper extrusion and said second part is a connection for a crush box.

8. The structure of claim 5, wherein said second part includes a mechanical fastener and extends through said first part.

9. The structure of claim 5, wherein said filler material is an aluminum material welded to said first part and brazed to said second part.

10. The structure of claim 5, wherein said first part surrounds said second part and includes slots exposing said second part, and said joint is disposed along said slots.

11. A structure including dissimilar materials, comprising:
a first part formed of an aluminum material and a second part formed of a steel material;

a transition plate formed of a mixture of aluminum material and steel material disposed between said first part and said second part, said transition plate including a notch; and a filler material extending along said transition plate and joining said first part to said second part, wherein said joint provided by said filler material starts and ends in said notch.

12. The structure of claim 11, wherein said filler material is an aluminum material welded to said first part and brazed to said second part.

13. A structure including dissimilar materials, comprising:

a first part formed of an aluminum material; and a second part formed of a steel material welded to said first part, wherein said second part includes a plurality of dimples and is welded to said first part along said dimples.

* * * * *